United States Patent [19]

Baird

[11] Patent Number: 5,213,128
[45] Date of Patent: May 25, 1993

[54] PRESSURE/TEMPERATURE-ACTIVATED PRESSURE RELIEF VALVE

[76] Inventor: Michael R. Baird, 54 New Market Dr., Delaware, Ohio 43015

[21] Appl. No.: 880,516

[22] Filed: May 8, 1992

Related U.S. Application Data

[63] Continuation-in-part of Ser. No. 811,461, Dec. 18, 1991, which is a continuation-in-part of Ser. No. 707,596, May 30, 1991, Pat. No. 5,161,738.

[51] Int. Cl.⁵ .................... F16K 17/14; F16K 17/40
[52] U.S. Cl. .................... 137/73; 137/68.1; 137/79
[58] Field of Search ............ 137/68.1, 72, 73, 79

[56] References Cited

U.S. PATENT DOCUMENTS

| | | | |
|---|---|---|---|
| 3,559,668 | 2/1971 | Crossman | 137/73 |
| 3,618,627 | 11/1971 | Wagner | 137/73 |
| 3,623,929 | 8/1966 | Seablom | 239/204 |
| 3,791,450 | 2/1974 | Poitras | 169/37 |
| 3,811,457 | 5/1974 | Crossman | 137/73 |
| 3,842,853 | 10/1974 | Kelly et al. | 137/72 X |
| 4,064,890 | 12/1977 | Collins et al. | 137/73 |
| 4,221,231 | 9/1980 | Harvey et al. | 137/72 |
| 4,352,365 | 10/1982 | Boccardo et al. | 137/68.1 |
| 4,403,627 | 9/1983 | Bradley | 137/508 |
| 4,732,188 | 3/1988 | Gabrlik et al. | 137/73 |
| 4,744,382 | 5/1988 | Visnic et al. | 137/73 X |
| 4,896,690 | 1/1990 | Taylor | 137/73 |
| 5,048,554 | 9/1991 | Kremer | 137/73 X |

Primary Examiner—John Rivell
Attorney, Agent, or Firm—Kinney & Lange

[57] ABSTRACT

A pressure relief valve, which can be pressure activated or thermally activated, includes a valve housing with an inlet communicating with an interior of a pressure vessel, and a passage from the inlet, through the housing, to an outlet for communicating with the exterior of the housing. A seal plug has a passageway which communicates between an inlet side of the passage and an outlet side of the passage. The seal plug is disposed within a cavity of the housing and across the passage. The seal plug retains a frangible disk against a radial shoulder of the passage for sealing the passage. Excessive pressures within the pressure vessel cause the frangible disk to rupture, thereby exposing a flow path between the inlet and the outlet through which the gas can escape. A thermal trigger engages the seal plug within the cavity to restrict movement of the seal plug and maintain a seal of the passage when a temperature adjacent to the housing is below a predetermined temperature threshold. The thermal trigger releases the seal plug, which is movable within the cavity, allowing the seal plug to relocate within the cavity when the temperature reaches the predetermined temperature threshold, thereby exposing a flow path between the inlet and outlet through which gas can escape.

15 Claims, 9 Drawing Sheets

PRESSURE/TEMPERATURE-ACTIVATED PRESSURE RELIEF VALVE

REFERENCE TO CO-PENDING APPLICATION

This application is a continuation-in-part of application Ser. No. 07/811,461, filed Dec. 18, 1991, entitled PRESSURE RELIEF VALVE WITH THERMAL TRIGGER AND MOVABLE SEAL PLUG by L. Wass et al, which is a continuation-in-part of application Ser. No. 07/707,596, filed May 30, 1991, now U.S. Pat. No. 5,161,738, entitled PRESSURE AND TEMPERATURE RELIEF VALVE WITH THERMAL TRIGGER by Lloyd G. Wass.

BACKGROUND OF THE INVENTION

The present invention relates to a relief valve. More particularly, the present invention relates to a relief valve for use with a compressed gas storage cylinder (or pressure vessel) which is capable of being activated by either excessive heat or pressure.

In high pressure compressed natural gas systems, it is a requirement to provide a means by which the pressure vessel can be relieved of its gas charge in the event of an excessively high external temperature (e.g., a fire near the vessel). In many instances, however, both pressure and thermal relief are required in one pressure relief system.

In providing for over-pressure relief, the preferred approach is to include a frangible disk (i.e., a disk that ruptures a predetermined pressure) in the system. The disk is exposed directly to the gas charge and acts as a barrier between an interior of the storage cylinder and an escape path within the relief system, which prevents the contents of the storage cylinder from escaping. If the internal pressure of the vessel increases to the disk's burst point, the disk ruptures thereby exposing the escape path for the gas charge.

As for thermal relief, the standard approach has been to incorporate a fusible plug into the design of the system (pressure vessel, valve) that is continuously exposed to the direct pressure of the gas charge. A fusible plug is a fitting that contains a slug of eutectic material that blocks and seals an outlet passage while the external temperature is below a predetermined yield point. When the temperature of the fusible plug reaches the yield temperature, the fusible material melts to provide a pathway for the pressurized gas to escape.

In principle, this approach to thermal relief is acceptable. A problem arises, however, when the fusible plug is exposed to the continuous high pressures of the gas charge at temperatures approaching the yield point of the eutectic material. In such condition, extrusion of the fusible slug may occur, thus producing a potential leak path.

A number of varying strategies can be applied to correct this problem through modification of the fusible plug (e.g., reducing bore diameter, increasing the yield temperature of the eutectic material). None of the strategies mentioned have thus far completely eliminated the problem. In addition, the ability to provide a pressure relief system which is responsive to either excessive temperature or pressure and yet has a reduced design complexity, overall size and manufacturing cost would improve the safety of a wide range of compressed gas storage cylinders.

SUMMARY OF THE INVENTION

The present invention is a pressure relief valve which is activated by either excessive pressure or heat. The relief valve includes a valve housing with an inlet for communicating with an interior of a pressure vessel, and a passage from the inlet, through the valve housing, to an outlet for communicating with the exterior of the valve housing. The passage serves as a flow path for the escape of fluid within the pressure vessel when predetermined pressure or temperature parameters are exceeded.

Framing the passage near the inlet is a radial shoulder, which provides a sealing surface. A generally cylindrical-shaped seal plug is disposed within a cavity of the housing and across the passage between the inlet and the outlet. The seal plug includes a passageway, which extends between an inlet-most end and an outlet-most end of the seal plug. The inlet-most end of the seal plug has a flat surface, which holds a frangible disk against the radial shoulder to effect a seal of the passage. The outlet-most end of the seal plug has a beveled annular exterior surface which contacts a thermal trigger and maintains the seal plug such that the frangible disk is in a sealed configuration between the seal plug and the radial shoulder. The frangible disk is capable of rupturing so as to expose a fluid flow path to the exterior of the valve housing when pressure within the interior of the pressure vessel exceeds a predetermined pressure threshold.

The thermal trigger, which is threadably mountable to the valve housing, incorporates a trigger ball into a channel at a first end of the thermal trigger. The trigger ball, which extends partially beyond the first end of the thermal trigger, is fixed by a small amount of soft metal eutectic within the channel. The trigger ball contacts the beveled annular surface of the seal plug and fixes the seal plug such that the frangible disk is held between the flat surface and the radial shoulder to seal the passage when the temperature near the valve housing is below a predetermined temperature threshold. When the thermal trigger reaches a predetermined temperature threshold, however, the eutectic melts and the trigger ball migrates within the channel of the thermal trigger to allow the frangible disk and the seal plug to move away from the radial shoulder. By moving the frangible disk and the seal plug away from the radial shoulder, the flow path through the passage is exposed, allowing fluid pressure to escape to the exterior of the valve housing. Because the eutectic within the thermal trigger does not directly contact fluid pressure, the present invention avoids eutectic creep problems which cause premature pressure leaks.

DETAILED DESCRIPTION OF THE PREFERRED EMBODIMENTS

Figure 1:
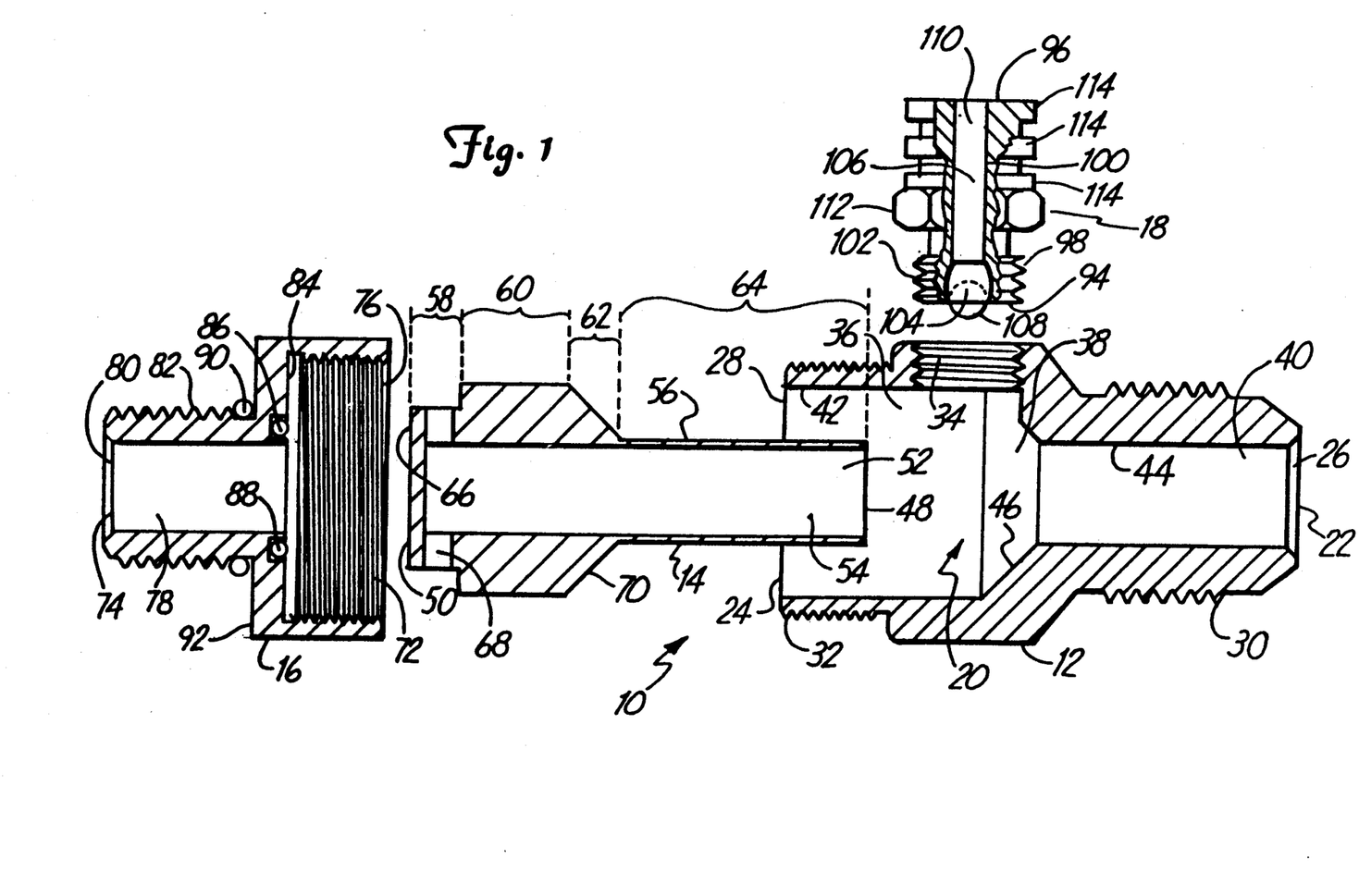
FIG. 1 is an exploded longitudinal sectional view of a first embodiment of the thermally activated relief valve of the present invention.

FIG. 1 is an exploded longitudinal sectional view of a thermally activated relief valve 10 of the present invention. Relief valve 10 includes valve housing 12, seal plug 14, torque fitting 16, and thermal trigger 18. Valve housing 12 includes cavity 20, first end 22 and second end 24. First end 22 defines the outer end of valve 10, and has outlet 26 which exposes cavity 20 to the exterior of housing 12. Second end 24 has opening 28 through which seal plug 14 is inserted to position seal plug 14 within cavity 20.

Housing 12 also includes coarse threaded exterior surface 30, which is near first end 22, and fine threaded exterior surface 32, which is located near second end 24. Coarse threaded exterior surface 30 is provided to accept a threaded cap or fitting (not shown) to cover first end 22. Fine threaded exterior surface 32 is provided to accept torque fitting 16. Valve housing 12 also includes threaded opening 34, which is generally perpendicular to and communicates with cavity 20. Threaded opening 34 is provided to accept thermal trigger 18.

Cavity 20 includes first cavity region 36, second cavity region 38 and third cavity region 40. First cavity region 36 has cylindrical inner surface 42, which has a diameter greater than cylindrical inner surface 44 of third cavity region 40. Second cavity region 38 has a radially tapered surface 46 which tapers from inner surface 42 to inner surface 44.

Seal plug 14 is an elongated, cylindrical-shaped plug which has first end 48 and second end 50. First end 48 has opening 52, which exposes uniform-diameter tubular passage 54. Outer surface 56 of seal plug 14 varies in diameter along the length of seal plug 14 to form first section 58, second section 60, third section 62, and fourth section 64. Section 58 is located at second end 50 and has a diameter smaller that the diameter of section 60. Section 58 includes seal plug surface 66 and exhaust port 68, adjacent to seal plug surface 66 and communicating with passage 54. In one embodiment, seal plug 14 includes two or more exhaust ports 68 equally spaced around the circumference of section 58.

Section 60 is adjacent to section 58 and has a diameter which is slightly larger than section 58. Section 62 is adjacent to section 60 and has a diameter which diminishes from section 60 to section 64, thereby forming tapered shoulder 70. Section 64 is adjacent to section 62 and has a diameter approximately equal to the smallest diameter of section 62. Generally, seal plug 14 is contoured so as to closely fit within cavity 20 of housing 12.

Torque fitting 16 is configured to enclose seal plug 14 within housing 12 and to attach valve 10 to a pressure cylinder. Torque fitting 16 includes first end 72 and second end 74. First end 72 is provided with threaded opening 76, which communicates with vent passage 78 and inlet 80 at second end 74. Second end 74 defines the inner (inlet) end of valve 10. Torque fitting 16 also has threaded exterior surface 82 for threading valve 10 into a threaded opening in a pressure vessel (shown in FIG. 2).

Threaded opening 76 has a diameter greater than vent passage 78, which creates shoulder 84 at the junction of vent passage 78 and threaded opening 76. Annular notch 86 is concentric with shoulder 84 and has an outer diameter less than the diameter of threaded opening 76 to provide a position for O-ring 88. O-ring 88 and shoulder 84 abut seal plug surface 66 of seal plug 14 so as to block vent passage 78 and provide a fluid-tight seal. O-ring 90 is positioned adjacent to mounting surface 92 to provide a fluid-tight seal when valve 10 is mounted to a pressure vessel.

Thermal trigger 18 has first end 94 and second end 96. First end 94 is provided with threaded exterior 98 which is sized to permit threading of thermal trigger 18 into threaded opening 34 of valve housing 12. Thermal trigger 18 has channel 100 extending generally along its longitudinal axis from first end 94 to second end 96. Shoulder 102 divides the channel generally into first channel 104 and second channel 106.

Thermal trigger 18 is also provided with trigger ball 108 which is sized to permit insertion into first channel 104. Trigger ball 108 is large enough, however, so that it abuts shoulder 102 and cannot pass into second channel 106. Channel 104 is swaged at first end 94 to engage a diameter of trigger ball 108 and retain a greater portion of trigger ball 108 within channel 104 while allowing another lesser portion to extend beyond first end 94. In the assembled state of thermal trigger 18, eutectic substance 110 fills channels 104 and 106 and holds trigger ball 108 in a fixed position within channel 104 and partially extending beyond first end 94 of thermal trigger 18.

Thermal trigger 18 includes hexagonal exterior surface 112 to accommodate an appropriate size wrench during installation of thermal trigger 18 into housing 12. Thermal trigger 18 also includes concentric ribs 114 for rapid heat absorption and communication to eutectic substance 110 in channels 104 and 106.

Figure 2:
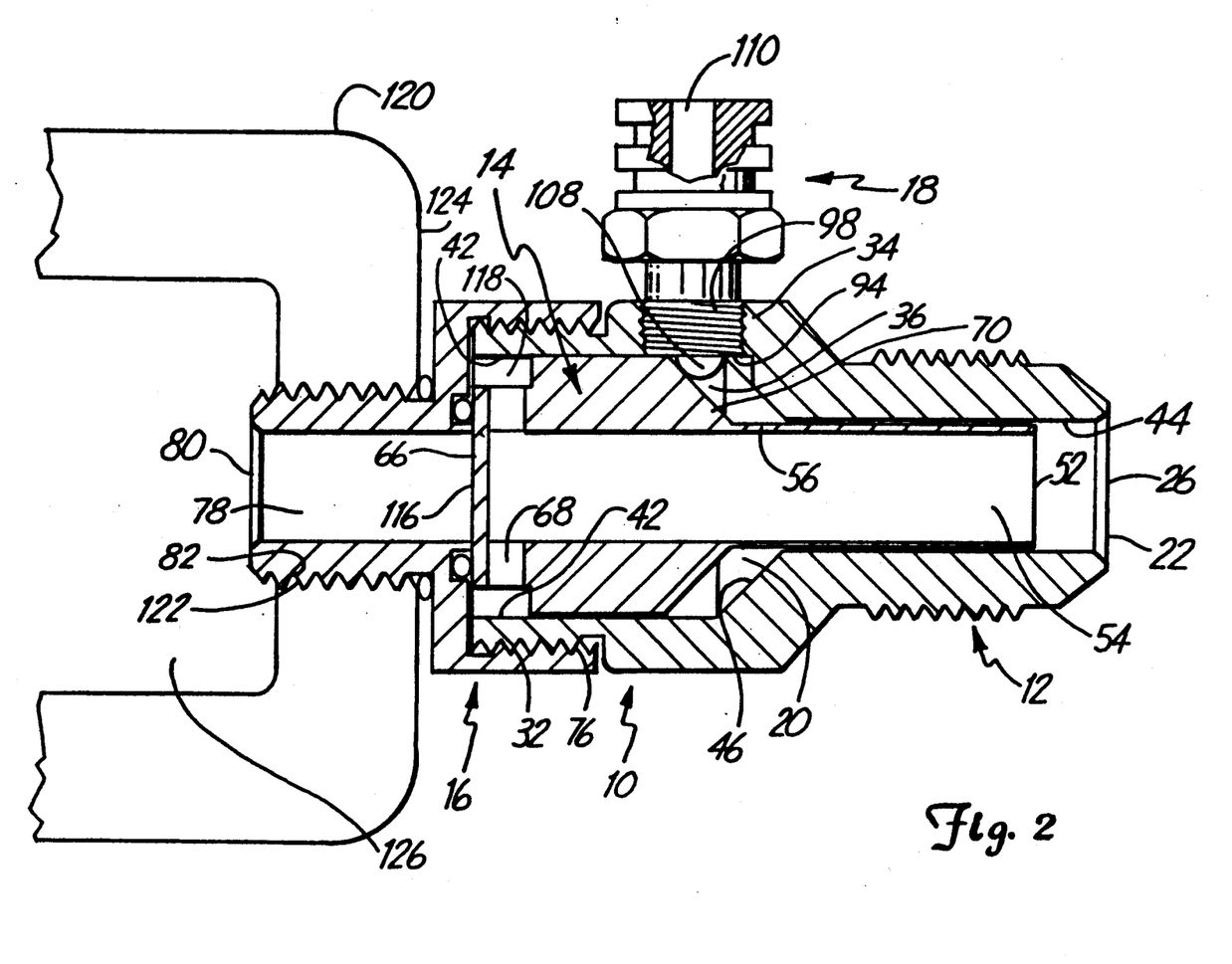
FIG. 2 is a longitudinal sectional view of the relief valve of FIG. 1 shown assembled and mounted to a pressure vessel.

FIG. 2 is a longitudinal sectional view of the pressure relief valve of FIG. 1 shown assembled and mounted to a pressure vessel. Thermal trigger 18 is shown mounted to valve housing 12 with threaded exterior 98 engaging threaded opening 34 of valve housing 12. First end 94 of thermal trigger 18 is generally aligned with cylindrical inner surface 42 of first cavity region 36. Trigger ball 108, which is partially extending beyond first end 94 of thermal trigger 18, lies within first cavity region 36 of housing 12.

Seal plug 14 lies within cavity 20 of valve housing 12. Outer surface 56 of sections 60 and 64 of seal plug 14 are configured to fit closely within, and permit movement within, cylindrical inner surfaces 42 and 44, respectively, of cavity 20. Seal plug 14 is positioned within cavity 20 such that tapered shoulder 70 rests against trigger ball 108. In this "loaded" position, tapered shoulder 70 and first end 48 of seal plug 14 are spaced apart from tapered inner surface 46 and first end 22 of housing 12, respectively, so as to permit seal plug 14 to move outward should trigger ball 108 relocate within channel 104 due to temperatures exceeding a predetermined temperature threshold.

Torque fitting 16 is connected to valve housing 12 by engaging threaded opening 76 over fine threaded exterior surface 32 of valve housing 12. A rotational force is applied in a first direction to torque fitting 16 to fully seat seal plug surface 66 against shoulder 84 and O-ring 88, thereby forming seal 116 and creating vent space 118 between cylindrical inner surface 42 and outer surface 56 of section 58 of seal plug 14. Seal 116 is a fluid-tight seal which separates vent passage 78 from vent space 118. Vent space 118 communicates with exhaust port 68.

Relief valve 10 is connected to pressure vessel 120 by engaging threaded exterior surface 82 of torque fitting 16 within threaded opening 122 of pressure vessel 120. A rotational force is applied to torque fitting 16 in a second direction to seat mounting surface 92 and O-ring 90 against outer surface 124 of pressure vessel 120. In this assembled state, inlet 80 of torque fitting 16 is exposed to interior 126 of pressure vessel 120.

Figure 3:
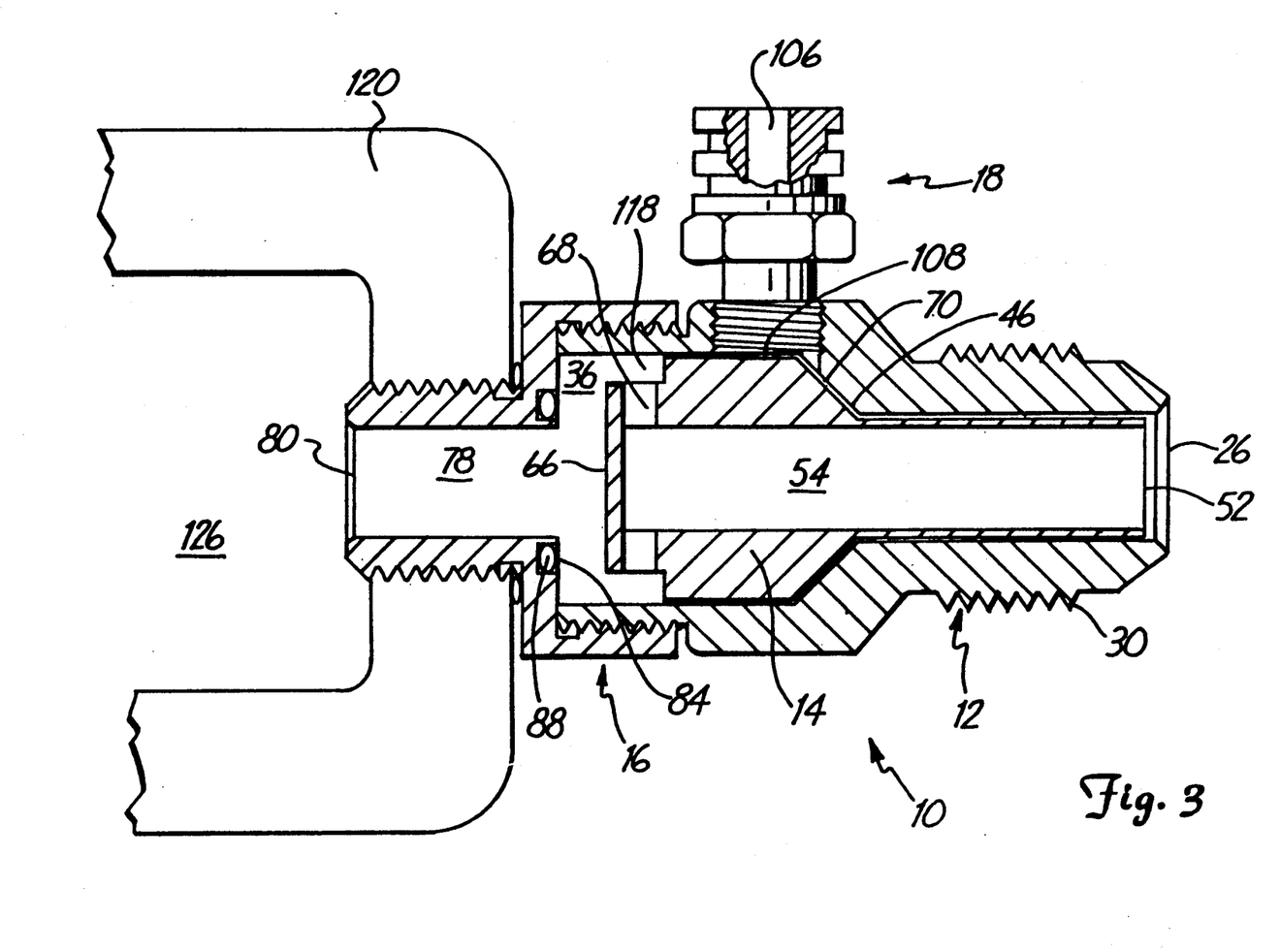
FIG. 3 is a longitudinal view of the relief valve of FIG. 2 in the thermally triggered position.

FIG. 3 is a longitudinal sectional view of the relief valve of FIG. 2 shown in the thermally triggered position. When thermal trigger 16 is exposed to temperatures that exceed a predetermined temperature threshold, eutectic substance 110 of channel 100 melts, thereby liberating trigger ball 108 from its fixed, semi-extended position within cavity 20 of housing 12. As eutectic substance 110 melts and trigger ball 108 becomes liberated within first chamber 104 of thermal trigger 18, gas pressure from interior 126 of pressure vessel 120 exerts an outward force on seal plug surface 66 of seal plug 14; this outward force causes seal plug surface 66 to move outward, away from shoulder 84, which coincidentally causes an outward force to be exerted against trigger ball 108 by tapered shoulder 70. Accordingly, trigger ball 108 relocates to a position primarily within chamber 104, against shoulder 102. In this position, it should be noted is that trigger ball 108 acts as a check valve. In other words, since trigger ball 108 is too large to pass into second channel 106, it rests against shoulder 102 to prevent any gas communication between the passage through valve 10 and the second end 96 of thermal trigger 18.

Seal plug 14 continues to move outward until tapered shoulder 70 contacts tapered inner surface 46. In this position, with seal plug surface 66 disengaged from shoulder 84 and O-ring 88, vent passage 78 is exposed to first cavity region 36, thereby allowing gas to escape through vent space 118, exhaust port 68, passage 54 and outlet 26 of valve housing 12. The flow of gas out of relief valve 10 can be halted by engaging a threaded seal cap (not shown) over coarse threaded exterior surface 30 to seal outlet 26 of valve housing 12. Alternatively, the escaping gas can be recaptured by engaging a threaded fitting, which is connected to a second vessel, over coarse threaded exterior surface 30.

Figure 4:
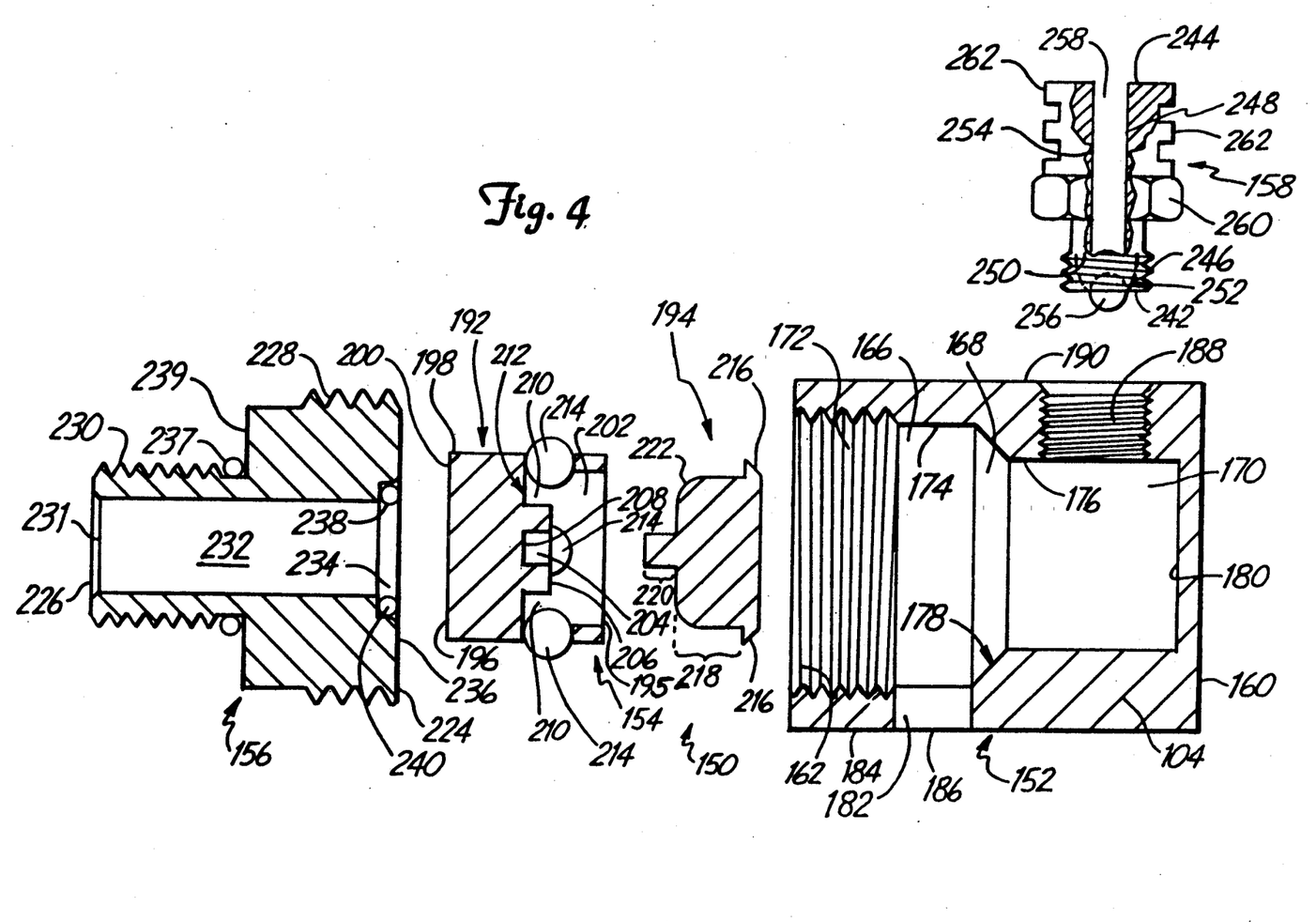
FIG. 4 is an exploded longitudinal sectional view of a second embodiment of the thermally activated relief valve of the present invention.

FIG. 4 is an exploded longitudinal sectional view of a second embodiment of the thermally activated relief valve of the present invention. As shown in FIG. 4, relief valve 150 includes valve housing 152, blocking poppet assembly 154, torque plug 156 and thermal trigger 158.

Valve housing 152, which is fashioned from a solid block of stainless steel, includes first end 160, second end 162 and cavity 164. Cavity 164 is generally cylindrical and is created by boring into the block from second end 162 to create first cavity region 166, second cavity region 168 and third cavity region 170. First cavity region 166 is near second end 162 and includes threaded opening 172. First cavity region 166 has inner surface 174, which has a diameter greater than the diameter of inner surface 176 of third cavity region 170. Second cavity region 168 has a radially tapered surface 178 which tapers from inner surface 174 to inner surface 176. Cavity 164 terminates at end surface 180 of third cavity region 170.

Exhaust passage 182 exposes first cavity region 166 to first side 184. Exhaust passage 182 is perpendicular to cavity 164 and includes outlet 186 through which gas pressure can escape.

Valve housing 152 also includes threaded opening 188, which is generally perpendicular to and communicates with cavity 164. Threaded opening 188 is exposed at second side 190, which is opposite first side 184, and is provided to accept thermal trigger 158.

Blocking poppet assembly 154 includes blocking poppet 192 and restraining member 194. Blocking poppet 192 is formed from a solid cylindrical piece of (metal) having first end 195, second end 196 and cylindrical surface 198. Second end 196 of blocking poppet 192 includes blocking surface 200. First end 195 is bored to provide first bore region 202 and second bore region 204. First bore region ends at first base 206. Second bore region 204, which is concentric with first bore region 202, ends at second base 208.

A multiplicity of holes 210 are bored into cylindrical surface 198, with sides 212 of holes 210 generally aligned with second base 208. Holes 210 have four locations, radially spaced 90° apart, around the circumference of cylindrical surface 198. Holes 210 are perpendicular to and communicate with first bore region 202. Each hole 210 is provided with ball 214, which is moveable within hole 210.

Figures 4A, 7:
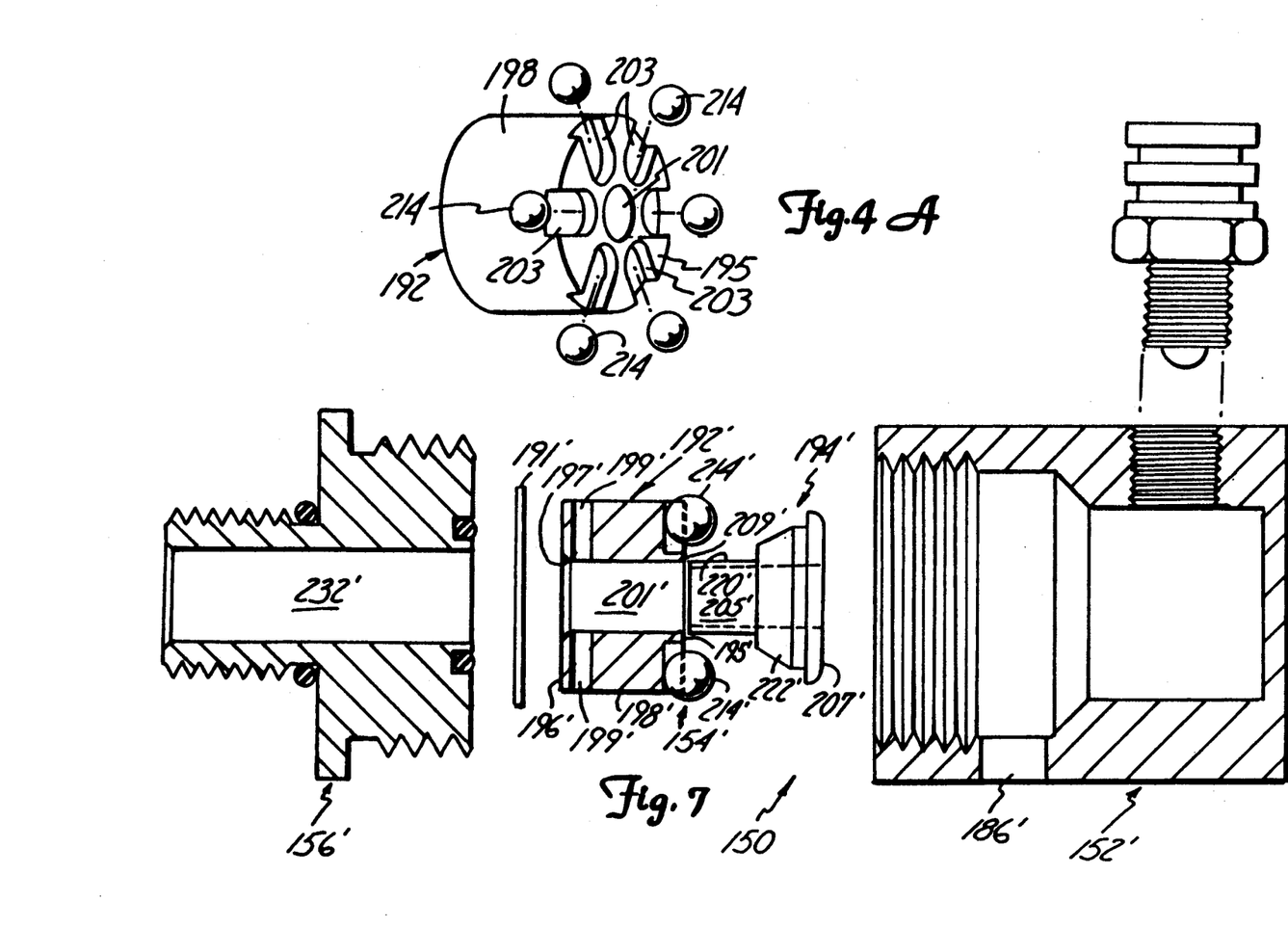
FIG. 4A is an enlarged perspective view of an alternative design of the blocking poppet of FIG. 4.
FIG. 7 is an exploded longitudinal sectional view of a third embodiment of the relief valve of the present invention.

An alternative embodiment of blocking poppet 192 is shown in FIG. 4A. As shown in FIG. 4A, first end 195 is bored to provide opening 201, which is concentric with a longitudinal axis of blocking poppet 192.

First end 195 also includes a plurality of radially spaced grooves 203, which are adjacent opening 201 and extend to cylindrical surface 198. In the embodiment shown in FIG. 4A, there are six grooves 203 with grooves 203 radially spaced apart by 60°. While six grooves are shown, other numbers and spacings of grooves 203 are implied within the scope of the invention. Like holes 210 of FIG. 4, grooves 203 are configured to hold balls 214, with balls 214 being movable within groove 203.

Restraining member 194 (shown in FIG. 4) is configured to fit within first and second cavity regions 202 and 204. Restraining member 194 includes bevelled edge 216, main body region 218 and pin 220. Main body region 218 is provided with rounded edge 222. In an alternative embodiment, rounded edge 222 is replaced by a radially tapered surface. When restraining member 194 is inserted within first and second boring regions 202 and 204, main body 218 lies within first bore region 202 and pin 220 lies within second bore region 204. When pin 220 is fully seated against second base 208 of second bore region 204, rounded edge 222 contacts balls 214 and exerts an outward force on balls 214, thereby causing balls 214 to extend beyond cylindrical surface 198. Alternatively, when pin 220 of restraining member 194 is inserted within opening 201 of blocking poppet 192 (shown in FIG. 4A), rounded edge 222 contacts balls 214 and exerts an outward force on balls 214, thereby causing balls 214 to partially extend beyond cylindrical surface 198.

Torque plug 156 is configured to enclose blocking poppet assembly 154 within valve housing 152 and to attach relief valve 150 to a pressure vessel. Torque plug 156 includes first end 224 and second end 226. First end 224 is provided with threaded exterior surface 228 for threading torque plug 156 within threaded opening 172 of valve housing 152. Second end 226 is provided with threaded exterior surface 230 for threading relief valve 150 into a threaded opening in a pressure vessel (shown in FIG. 5). Second end 224 has inlet 231, which exposes cylindrical passage 232 to the interior of a pressure vessel (shown in FIG. 5). Passage 232 is exposed at first end 224 and is framed by annular notch 234 and annular shoulder 236. Annular notch 234 is concentric with passage 232 and has a diameter slightly larger than passage 232, which provides surface 238 against which O-ring 240 rests. Shoulder 236 has a diameter greater than annular notch 234 and is concentric with annular notch 234. Annular shoulder 236 provides a flat metal surface against which blocking surface 200 of blocking poppet 192 is sealed when the temperature near housing 152 is below the predetermined temperature threshold. O-ring 240 also contacts blocking surface 200 to provide an impermeable seal across passage 232. O-ring 237 is positioned adjacent to mounting surface 239 to provide a fluid-tight seal when valve 150 is mounted to a pressure vessel.

Thermal trigger 158 is similar to thermal trigger 18 as shown in FIGS. 1–3. Thermal trigger 158 includes first end 242 and second end 244. First end 242 is provided with threaded exterior surface 246, which is sized to permit threading of thermal trigger 158 into threaded opening 188 of valve housing 152. Thermal trigger 158 has channel 248 extending generally along its longitudinal axis from first end 242 to second end 244. Shoulder 250 divides channel 248 generally into first channel 252 and second channel 254.

Thermal trigger 158 is also provided with trigger ball 256 which is sized to permit insertion into first channel 252. Trigger ball 256 is large enough, however, so that it abuts shoulder 250 and cannot pass into second channel 254. First channel 252 is swaged at first end 242 to engage a diameter of trigger ball 256 and retain a greater portion of trigger ball 256 within channel 252, while allowing another lesser portion to extend beyond first end 242. In the assembled state of thermal trigger 158, eutectic substance 258 fills channels 252 and 254, and holds trigger ball 256 in a fixed position within channel 252 and partially extending beyond first end 242 of thermal trigger 158.

Like thermal trigger 18 shown in FIGS. 1–3, thermal trigger 158 includes hexagonal exterior surface 260 to accommodate an appropriate size wrench during installation of thermal trigger 158 into valve housing 152. Thermal trigger 158 also includes concentric ribs 262 for rapid heat absorption and communication to eutectic substance 258 in channels 252 and 254.

Figure 5:
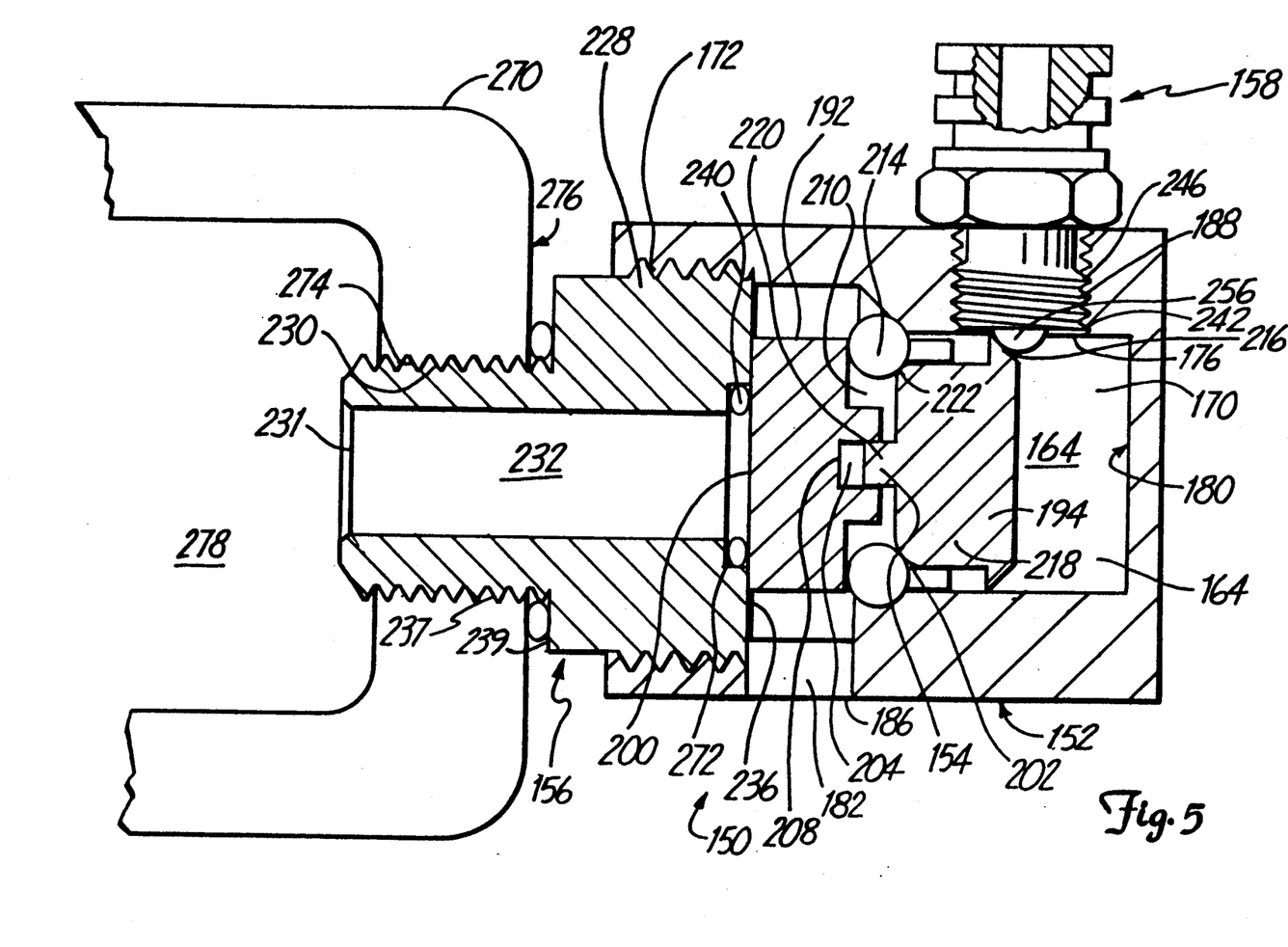
FIG. 5 is a longitudinal sectional view of the relief valve of FIG. 4 shown assembled and mounted to a pressure vessel.

FIG. 5 is a longitudinal sectional view of the relief valve of FIG. 4 shown assembled and mounted to pressure vessel 270. Thermal trigger 158 is shown mounted to valve housing 152, with threaded exterior 246 engaging threaded opening 188 of valve housing 152. First end 242 of thermal trigger 158 is generally aligned with inner surface 176 of third cavity region 170. Trigger ball 256, which is partially extended beyond first end 242 of thermal trigger 158, lies within third cavity region 170 of valve housing 152.

Blocking poppet assembly 154 lies within cavity 164 of valve housing 152. Restraining member 194 is positioned within cavity 164 such that beveled edge 216 rests against trigger ball 256 when pin 220 and main body region 218 are seated within first bore region 202 and second bore region 204, respectfully, with pin 220 contacting second base 208 of second bore region 204. In this "loaded" position, rounded edge 222 contacts balls 214 and exerts an outward force on balls 214 which causes balls 214 to extend beyond cylindrical surface 198 and engage radially tapered surface 178 of second cavity region 168. With balls 214 engaging tapered surface 178, blocking poppet 192 is restricted from moving within cavity 164 toward end surface 180. Ample space exists between beveled edge 216 of restraining member 194 and end surface 180 of third cavity region 170 so as to permit blocking poppet assembly 154 to move toward end surface 180 should trigger ball 256 relocate within channel 252 due to temperatures exceeding a predetermined temperature threshold.

Torque plug 156 is connected to valve housing 152 by engaging threaded exterior surface 228 within threaded opening 172 of valve housing 152. A rotational force is applied in a first direction to torque plug 156 to full seat blocking surface 200 against annular shoulder 236 and O-ring 240, thereby forming seal 272. Seal 272 is a fluid tight seal which separates passage 232 from cavity 164 of valve housing 152.

Relief valve 150 is connected to pressure vessel 270 by engaging threaded exterior surface 230 of torque plug 156 within threaded opening 274 of pressure vessel 270. A rotational force is applied to torque plug 156 in a second direction to seat mounting surface 239 and O-ring 237 against outer surface 276 of pressure vessel 270. In this assembled state, inlet 231 of torque plug 156 is exposed to interior 278 of pressure vessel 270.

Figure 6:
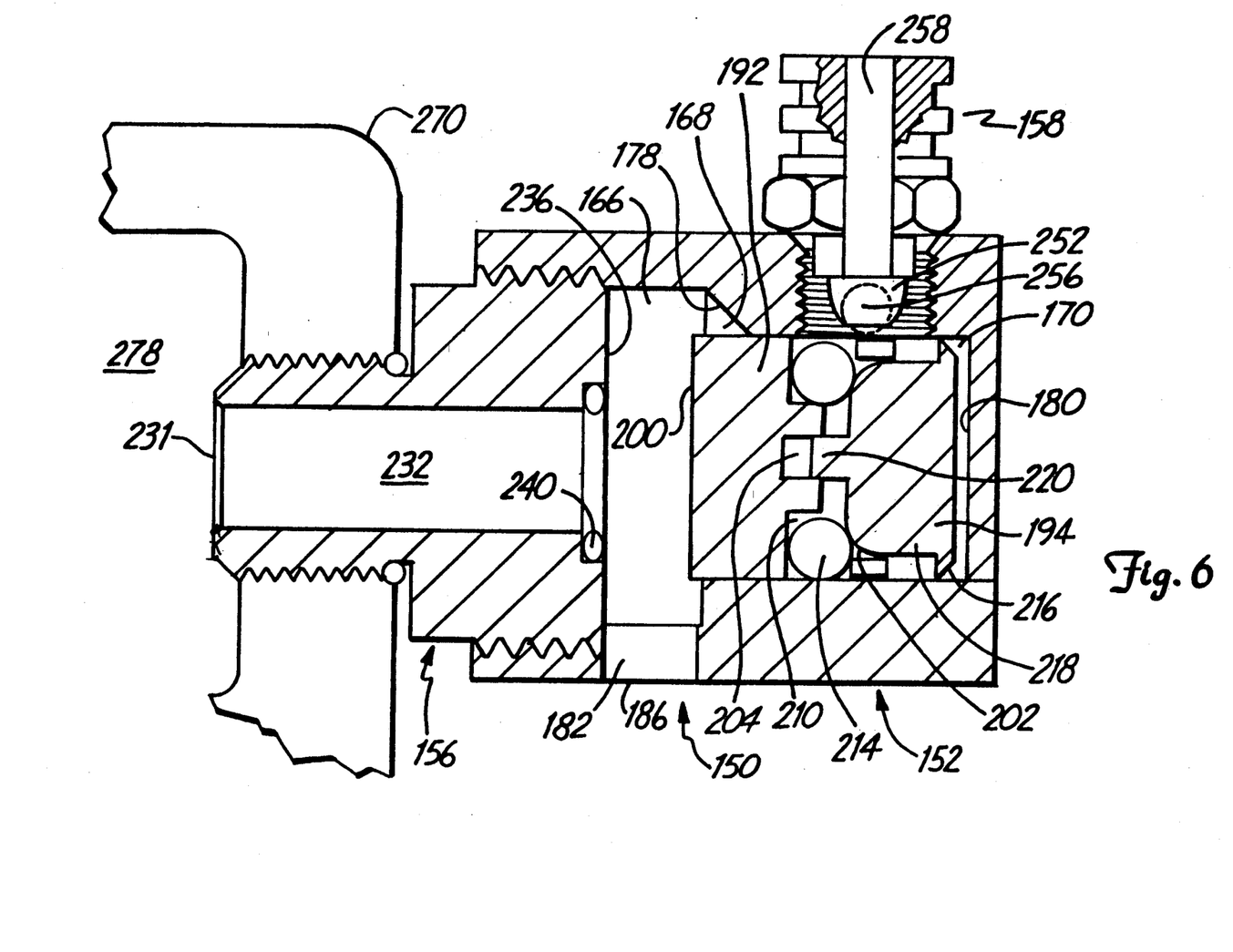
FIG. 6 is a longitudinal sectional view of the relief valve of FIG. 5 in the thermally triggered position.

FIG. 6 is a longitudinal sectional view of the relief valve of FIG. 5 shown in the thermally triggered position. When thermal trigger 158 is exposed to temperatures that exceed a predetermined temperature threshold, eutectic substance 258 of channel 248 melts, thereby liberating trigger ball 256 from its fixed, semi-extended position within cavity 164 of valve housing 152. As eutectic substance 258 melts and trigger ball 256 becomes liberated within first chamber 252 of thermal trigger 158, restraining member 194 moves toward end surface 180 of third cavity region 170. As restraining member 194 moves towards end surface 180, pin 220 withdraws from second bore region 204, and rounded edge 222 moves away from balls 214, thereby allowing balls 214 to disengage from tapered surface 178 of second cavity region 168 and retreat within holes 210 of blocking poppet 192. With balls 214 disengaged from tapered surface 178, gas pressure from interior 278 of pressure vessel 270 exerts an outward force on blocking surface 200 of blocking poppet 192, which moves blocking poppet 192 towards third cavity region 170. As blocking poppet 192 moves towards third cavity region 170, seal 272 is broken, thereby exposing passage 232 to first cavity region 166. With first cavity region 166 exposed to passage 232, a right angle flow path is exposed from inlet 231, through passage 232 to first cavity region 166, and through exhaust passage 182 to outlet 186.

It should be noted that like trigger ball 108 shown in FIGS. 1–3, trigger ball 256 acts as a check valve. In other words, since trigger ball 256 is too large to pass into second channel 254, it rests against shoulder 250 to prevent any gas communication between the passage through valve 150 and the second end 244 of thermal trigger 158.

FIG. 7 is an exploded longitudinal sectional view of a third embodiment of the relief valve of the present invention. This third embodiment is similar to the second embodiment shown in FIG. 4 and 4A, with novel modifications to blocking poppet assembly 154' enabling relief valve 150' to be activated if pressure within the pressure vessel exceeds a predetermined pressure. As shown in FIG. 7, blocking poppet assembly 154' includes frangible disk 191', blocking poppet 192' and restraining member 194'.

Frangible disk 191' is a thin metal disk made of Monel 400, which is capable of forming a barrier across passage 232' of torque plug 156'. Frangible disk 191' is configured to maintain a sealed condition of passage 232' when pressures within the interior of a pressure vessel remain below a predetermined value. Frangible disk 191' is capable of bursting when the pressure within the pressure vessel exceeds a predetermined value, thereby relieving the interior of a pressure vessel from excessive pressure.

Blocking poppet 192' is similar to blocking poppet 192 of FIG. 4A with three exceptions. First, opening 201' extends from first end 195' to second end 196'. Opening 201' is generally aligned with passage 232' of torque plug 156'. Opening 201' serves as a passage extension, which establishes a flow path through relief valve 150' when frangible disk 191' bursts due to excessive pressure. Second, opening 201' is slightly enlarged near second end 196', as shown by tapered opening 197'. Tapered opening 197' is so configured to provide a surface at second end 196' necessary for frangible disk 191' to burst at the appropriate predetermined pressure. Third, cylindrical surface 198' includes a plurality of bores 199', which are perpendicular to and communicate between cylindrical surface 198' and opening 201'. As shown in FIG. 7, bores 199' are positioned nearer second end 196'. Bores 191' provide an alternative flow path from passage 232' to outlet 186' of valve housing 152'. In one embodiment, bores 199' are radially spaced 90° apart around the circumference of cylindrical surface 198'.

Restraining member 194' is similar to restraining member 194 shown in FIG. 4; however, restraining member 194' includes passageway 205', which extends from first end 207' to second end 209'. Passageway 205' is generally aligned with opening 201' such that when pin 220' is inserted within opening 201', a complete flow path from passage 232' to outlet 186' is established through blocking poppet assembly 154'. As also shown in FIG. 7, radially tapered surface 222' of restraining member 194' replaces rounded edge 222 of restraining member 194 (shown in FIG. 4). As can be appreciated, opening 201' and passageway 205' may have various diameters according to the size of the pressure vessel to be discharged.

Figure 8:
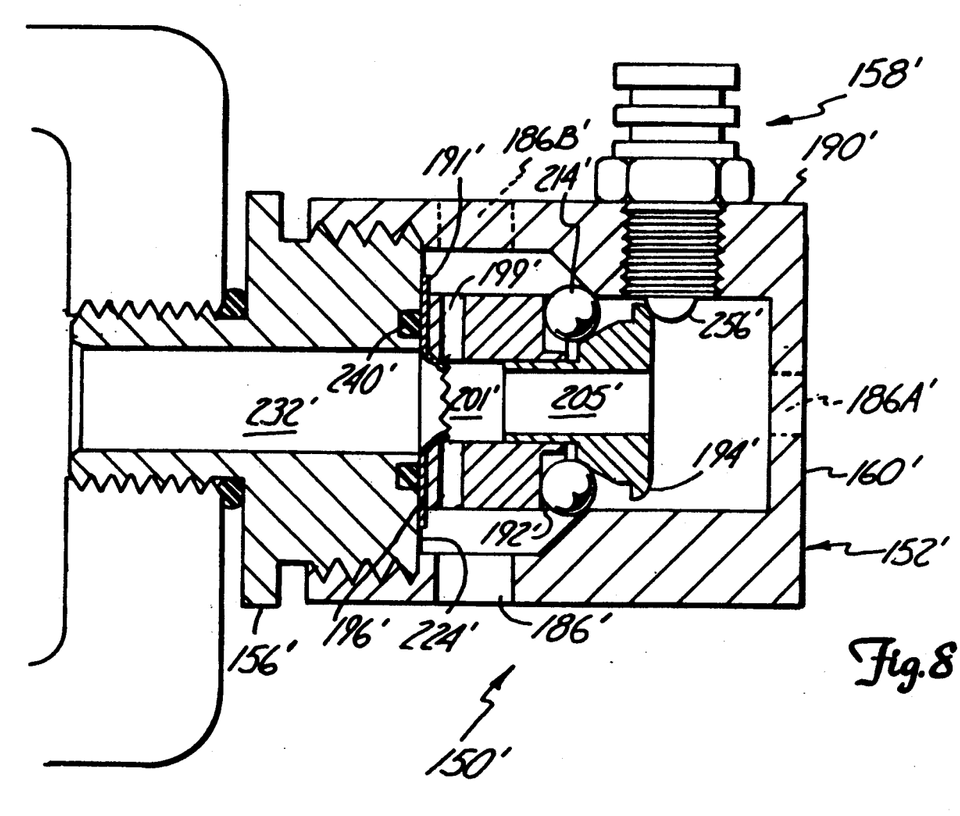
FIG. 8 shows the relief valve of FIG. 7 assembled with the frangible disk ruptured.

FIG. 8 shows the relief valve of FIG. 7 assembled with the frangible disk ruptured. As shown in FIG. 8, a seal across passage 232' is formed when frangible disk 191' is held against O-ring 240' and first end 224' of torque plug 156' by second end 196' of blocking poppet 192'. As in the embodiment shown in FIG. 4, restraining member 194' interacts with detent 256' of thermal trigger 158' and balls 214' to maintain second end 196' of blocking poppet 192' against frangible disk 191', thereby affecting the seal of passage 232'.

As shown in FIG. 8, when frangible disk 191' bursts due to excessive pressure within the interior of a pressure vessel, a flow path is established through passage 232', opening 201', bores 199', an outlet 186' of housing 152'. Various numbers and locations of outlet 186' are possible, as shown in FIG. 8. For instance, outlet 186A' can be located at first end 160' of housing 152'. Alternatively, outlet 186B' can be located at second side 190'. The location and number of outlets 186' will be determined according to the specific location of relief valve 150' on a pressure vessel. Where outlet 186A' is located solely at first end 160', a flow path exists between passage 232', opening 201', passageway 205', and outlet 186A'.

Figure 9:
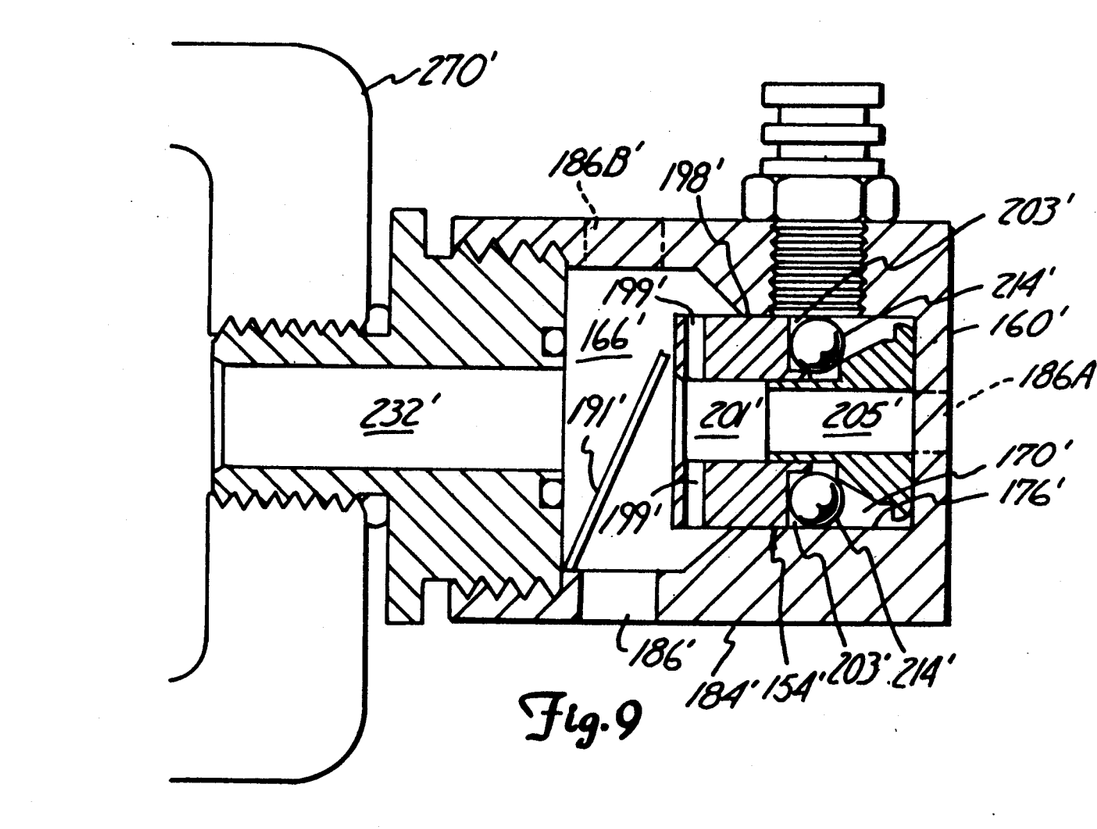
FIG. 9 is a longitudinal sectional view of the relief valve of FIG. 7 in the thermally triggered position.

FIG. 9 is a longitudinal sectional view of the relief valve of FIG. 7 in the thermally triggered position. Operation of blocking poppet assembly 154' is similar to that described relative to FIG. 6. As can be seen by FIG. 9, however, balls 214' are retained within grooves 203' due to the relatively close tolerance of cylindrical surface 198' and inner surface 176' of third cavity region 170'. In this triggered position, frangible disk 191' and blocking poppet assembly 154' are forced away from passage 232' by fluid pressure from the interior of pressure vessel 270'. This movement establishes a flow path according to the location of outlet 186'. Where outlet 186' is located at first side 184', a flow path exists from passage 232' through first cavity region 166' and out outlet 186'. Alternatively, where outlet 186A' is located at first end 160', a flow path exists from passage 232', through first cavity region 166', opening 201', passageway 205', and out outlet 186A'. Additional fluid flow is possible through bores 199', opening 201', passageway 205', and out outlet 186A'.

Although the present invention has been described with reference to preferred embodiments, workers skilled in the art will recognize that changes may be made in form and detail without departing from the spirit and scope of the invention.

What is claimed is:

1. A pressure relief valve for use with a high pressure compressed gas receptacle, comprising:
   a valve housing, for coupling to the receptacle, having a communication passage with an inlet for positioning within an interior of the receptacle and an outlet to an exterior of the housing, and a radial shoulder between the inlet and the outlet for framing the passage;
   a seal plug, movable within the passage, with a first side oriented toward the interior of the receptacle and in close proximity to and configured to be capable of moving away from the shoulder, a second biased side and a passageway between the first and second side which is capable of communicating with the passage;
   means between the first side of the seal plug and the shoulder for sealing the passageway for so long as pressure within the interior of the receptacle remains below a predetermined value, and for exposing the passageway when pressure within the interior of the receptacle exceeds the predetermined value; and
   thermal trigger means, connected to the valve housing and operably contacting the second biased side of the seal plug, for holding the first side of the seal plug in close proximity to the shoulder while the thermal trigger means is below a predetermined temperature threshold, and for releasing the seal plug when the predetermined temperature threshold is reached to allow gas pressure to move the means for sealing the passageway and the first side of the seal plug away from the shoulder to establish a flow path for fluid pressure from the inlet through the passage to the outlet.

2. The valve of claim wherein the thermal trigger means comprises:
   a trigger housing having an inner chamber with a first and second end;
   a thermally sensitive eutectic substance within the inner chamber of the trigger housing wherein the eutectic substance is in a solid state when its temperature is below the predetermined temperature threshold, and wherein the eutectic substance is in a liquid state when its temperature reaches the predetermined temperature threshold; and
   a detent, movable within the second end of the chamber, with a first area contacting the eutectic substance and a second area engaging the second biased side of the seal plug, the detent restraining the seal plug while the eutectic substance is below the predetermined temperature threshold so that the first side of the seal plug makes a fluid tight seal against the shoulder, and further moving within the second end of the chamber when the eutectic substance reaches the predetermined temperature threshold so as to disengage the second biased side of the seal plug and allow the plug to move away from the shoulder.

3. The valve of claim 2 wherein the thermal trigger means further comprises:
   check valve means for preventing gas pressure from escaping through the inner chamber of the thermal trigger after the first side of the seal plug moves away from the shoulder.

4. The valve of claim 1 wherein exposing the interior of the receptacle to pressure above the predetermined valve causes the sealing means to expose the passageway and establish the flow path.

5. The valve of claim 1 wherein the seal plug comprises:
   a first plug member;
   a second plug member; and
   means between the first and second plug members for retaining the first plug member within the passage, the first plug member bearing the first side of the seal plug, and the second plug member bearing the second biased side of the seal plug.

6. A pressure relief valve for releasing pressure from a container when the relief valve senses predetermined pressure or temperature conditions, the relief valve comprising:
   a valve housing, for coupling to the receptacle, having a communication passage with an inlet for positioning within an interior of the receptacle and an outlet to an exterior of the housing;
   means for effecting a seal of the passage until either pressure within the interior of the receptacle exceeds a predetermined threshold or temperature external to and near the receptacle exceeds a predetermined temperature threshold; and
   a thermal trigger, operably coupled to the seal effecting means for releasing the seal effecting means, the thermal trigger comprising: a trigger housing which is connectable to the valve housing and has an inner chamber with a first and second end; a thermally sensitive eutectic substance within the inner chamber of the trigger housing wherein the eutectic substance is in a solid state when its temperature is below the predetermined temperature threshold, and wherein the eutectic substance is in a liquid state when its temperature reaches the predetermined temperature threshold; and a detent, movable within the passage, with a first area contacting the eutectic substance and a second area engaging a biased side of the movable member, the detent restraining the seal effecting means while the eutectic substance is below the predetermined temperature threshold, and further moving within the second end of the chamber when the eutectic substance reaches the predetermined temperature threshold so as to disengage the biased side of the seal effecting means and allow the seal effecting means to move within the passage and interrupt the seal.

7. A pressure relief valve for releasing pressure from a container, the relief valve comprising:
   a valve housing having a passage with an inlet for communicating with an interior of the container, and an outlet for communicating with an exterior of the valve housing;
   a seal, disposed within the passage between the inlet and the outlet, for sealing the passage the seal capable of exposing the passage when pressure within the container exceeds a predetermined threshold;
   a movable member, disposed between the outlet and the seal and configured to be capable of moving away from the seal, for interrupting the seal when the ambient temperature adjacent to the relief valve reaches a predetermined threshold; and
   a thermally responsive device, mounted to the valve housing, for engaging the movable member and restraining the movable member from interrupting the seal when the ambient temperature adjacent to the relief valve is below the predetermined temperature threshold, and for disengaging the movable member when the ambient temperature adjacent to the relief valve reaches the predetermined temperature threshold so as to allow the movable member to interrupt the seal and expose a flow path through the passage from the inlet to the outlet.

8. The pressure relief valve of claim 7 wherein the thermally responsive device comprises:
   a thermally sensitive plug, having an open inner chamber exposed at a first and a second end of the thermally sensitive plug;
   a detent, movable within and extending partially outside the chamber at the second end of the thermally sensitive plug for engaging a surface of the movable member; and
   a thermally sensitive eutectic substance, within the inner chamber of the thermally sensitive plug, having a solid state below the predetermined temperature threshold and a mollified state at the predetermined temperature threshold, wherein the eutectic substance contacts a first region of the detent and fixes the detent within and partially extending from the inner chamber at the second end of the thermally sensitive plug when the eutectic substance is in the solid state, and wherein the eutectic substance allows the detent to migrate within the inner chamber toward the first end of the thermally sensitive plug when the eutectic substance is in the mollified state so as to disengage the surface of the movable member.

9. The valve of claim 8 wherein the movable member comprises:

a cylindrical blocking poppet having a first side oriented toward the seal, a second side opposite the first side and a third cylindrical side, the second side having a central opening and plurality of radially spaced grooves adjacent to the opening and extending to the third side, wherein each groove contains a movable ball; and a restraining member having a radially tapered edge, a radially tapered body and a guide member, the tapered body positioned between the tapered edge and the guide member, wherein the tapered edge slants in a first direction and the tapered body slants in a second direction opposite the first direction, the guide member configured to slidably fit within the central opening of the blocking poppet, the tapered body configured to exert an outward force on the balls, relative to the opening, when the guide member is positioned within the opening.

10. The valve of claim 9 wherein the radially tapered edge of the restraining member contacts the detent of the thermally responsive device, and wherein inserting the guide member within the opening of the blocking poppet causes the tapered body to contact and exert the outward force on the balls, the balls thereby moving outward to engage a biased surface of the passage so as to fix the poppet securely within the passage and maintain a close proximity of the first side of the blocking poppet and the seal.

11. The valve of claim 10 wherein the radially tapered body of the restraining member disengages the balls when the detent disengages the radially tapered edge of the restraining member.

12. The valve of claim 11 wherein under gas pressure from the interior of the receptacle, the balls move inward and disengage the biased surface of the passage when the radially tapered body of the restraining member disengages the balls, thereby allowing the movable member to interrupt the seal and expose the passage to the interior of the receptacle.

13. The pressure relief valve of claim 10 wherein the movable member further comprises:

a passageway through the blocking poppet and the restraining member, the passageway capable of communicating between the inlet and the outlet of the passage.

14. The pressure relief valve of claim 13 wherein the seal includes a frangible disk between the movable member and a sealing surface abutting an O-ring, wherein the frangible disk maintains the seal while pressure within the interior of the container remains below a predetermined pressure and exposes the passage when pressure within the interior of the container exceeds the predetermined pressure.

15. The pressure relief valve of claim 14 wherein applying pressure in excess of a predetermined amount to the frangible disk causes the disk to rupture and expose the passageway, thereby establishing a flow path from the interior of the container to the exterior of the valve housing through which fluid pressure can escape.

* * * * *

UNITED STATES PATENT AND TRADEMARK OFFICE
CERTIFICATE OF CORRECTION

PATENT NO. : 5,213,128
DATED : May 25, 1993
INVENTOR(S) : MICHAEL R. BAIRD

It is certified that error appears in the above-identified patent and that said Letters Patent is hereby corrected as shown below:

Col. 11, line 4, delete "claim", insert --claim 1--

Signed and Sealed this

Twenty-fifth Day of January, 1994

Attest:

BRUCE LEHMAN

Attesting Officer

Commissioner of Patents and Trademarks